US012752612B2

(12) United States Patent
Krantz et al.

(10) Patent No.: US 12,752,612 B2
(45) Date of Patent: Oct. 6, 2026

(54) TRAILER-BASED MOBILE OBSERVATORY ENCLOSURE

(71) Applicant: Arizona Board of Regents on Behalf of the University of Arizona, Tucson, AZ (US)

(72) Inventors: Harrison Krantz, Tucson, AZ (US); Adam D. Block, Tucson, AZ (US); Eric C. Pearce, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 491 days.

(21) Appl. No.: 18/034,505

(22) PCT Filed: Oct. 29, 2021

(86) PCT No.: PCT/US2021/072128
§ 371 (c)(1),
(2) Date: Apr. 28, 2023

(87) PCT Pub. No.: WO2022/094604
PCT Pub. Date: May 5, 2022

(65) Prior Publication Data
US 2023/0398848 A1 Dec. 14, 2023

Related U.S. Application Data

(60) Provisional application No. 63/107,203, filed on Oct. 29, 2020.

(51) Int. Cl.
*B60J 7/16* (2006.01)
*B60P 3/00* (2006.01)
(Continued)

(52) U.S. Cl.
CPC ............... *B60J 7/1621* (2013.01); *B60P 3/00* (2013.01); *B60R 16/03* (2013.01); *B62D 63/061* (2013.01);
(Continued)

(58) Field of Classification Search
CPC . B60J 7/1621; B60J 7/028; B60P 3/00; B60R 16/03; B62D 63/061; E05F 15/627;
(Continued)

(56) References Cited

U.S. PATENT DOCUMENTS 3,740,092 A 6/1973 Page
3,823,977 A 7/1974 Fioravanti
(Continued)

FOREIGN PATENT DOCUMENTS

CN 105467470 A 4/2016
CN 106291765 A 1/2017
(Continued)

OTHER PUBLICATIONS www.AstroHaven.com Deep Space Products (Wayback Machine Dates: May 4, 2020, Aug. 13, 2020, Sep. 28, 2020) (Year: 2020).*
(Continued)

*Primary Examiner* — Peter D Nolan
*Assistant Examiner* — Demetra R Smith-Stewart
(74) *Attorney, Agent, or Firm* — Thomas | Horstemeyer, LLP

(57) ABSTRACT

A trailer-based mobile observatory is provided that has a roof that is stable under gravity in the both the opened and closed positions to ensure better mobility and robustness for travel while eliminating the risk of the roof opening during travel. This ensures that if there is any mechanical failure while the roof is in the closed position, the roof will remain closed. The trailer-based mobile observatory enclosure can be designed to house one or more telescopes and to enable remote and robotic operation. The enclosure is designed for easy deployment and reliable operation with much thought put into possible failures and ensuring that any failure that occurs does not put the telescope and instruments at risk.

20 Claims, 15 Drawing Sheets

(51) Int. Cl.

| | |
|---|---|
| ***B60R 16/03*** | (2006.01) |
| ***B62D 63/06*** | (2006.01) |
| ***E05F 15/627*** | (2015.01) |

(52) U.S. Cl.
CPC ....... *E05F 15/627* (2015.01); *E05Y 2201/474* (2013.01); *E05Y 2201/624* (2013.01); *E05Y 2201/668* (2013.01); *E05Y 2400/40* (2013.01); *E05Y 2900/512* (2013.01); *E05Y 2900/542* (2013.01)

(58) Field of Classification Search
CPC ......... E05Y 2201/474; E05Y 2201/624; E05Y 2201/668; E05Y 2400/40; E05Y 2900/512; E05Y 2900/542; E05Y 2201/656; E05Y 2201/672; E05Y 2900/516
See application file for complete search history.

(56) References Cited

U.S. PATENT DOCUMENTS

| | | | | |
|---|---|---|---|---|
| 4,542,931 | A | 9/1985 | Walker, Jr. | |
| 5,133,586 | A | 7/1992 | Anderson | |
| 5,988,732 | A | 11/1999 | Schouten | |
| 6,139,090 | A | 10/2000 | Stidd | |
| 7,527,280 | B1 | 5/2009 | Zahmeier | |
| 2006/0066131 | A1* | 3/2006 | Nebel | B60P 3/39 296/156 |
| 2011/0309651 | A1 | 12/2011 | Hernandez | |
| 2018/0086186 | A1* | 3/2018 | Haag | B60P 1/28 |
| 2019/0315264 | A1 | 10/2019 | Swab | |

FOREIGN PATENT DOCUMENTS

| | | | |
|---|---|---|---|
| CN | 106398495 | A | 2/2017 |
| CN | 109462657 | A | 3/2019 |
| CN | 110244447 | A | 9/2019 |
| CN | 210264062 | U | 4/2020 |
| KR | 101323808 | B1 | 8/2013 |
| KR | 101782988 | B1 | 9/2017 |

OTHER PUBLICATIONS www.cloudynights.com/topic/570149-dome-power-rotating/ (Year: 2017).* www.piertechinc.com/mobile-observatories/star-traveler-xl/ (Wayback Machine Dates: Aug. 9, 2020) (Year: 2020).*

International Search Report for PCT/US21/72128 mailed Jan. 28, 2022.

Pearce, et al.: Pomenis: A Small Portable Astrograph for Synoptic SSA, The Advanced Maui Optical and Space Surveillance Technologies Conference, Sep. 2018.

* cited by examiner

TRAILER-BASED MOBILE OBSERVATORY ENCLOSURE

CROSS REFERENCE TO RELATED APPLICATIONS

This application is the 35 U.S.C. § 371 national stage application of PCT Application No. PCT/US2021/072128, filed Oct. 29, 2021, which claims priority to, and the benefit of U.S. provisional application entitled "A TRAILER-BASED MOBILE OBSERVATORY ENCLOSURE" having Ser. No. 63/107,203, filed Oct. 29, 2020, both of which are hereby incorporated by reference herein in their entireties.

BACKGROUND

In response to the anticipated launch of Sputnik in 1957, the Smithsonian Astrophysical Observatory (SAO) was funded to develop and deploy an optical network to detect, track, and determine the orbits of Sputnik and those satellites that would follow. To support this mission, the SAO contracted Boller & Chivens to manufacture 12 Baker-Nunn Schmidt cameras. The Baker-Nunn telescopes used an innovative 51 cm three-element corrector lens assembly and 76 cm f/0.75 primary mirror. The very wide 5°×30° field of view was imaged onto a 25 cm segment of 55 mm wide cinemascope film. The Baker-Nunn telescopes would be deployed to form the first worldwide optical tracking network, and later the operational techniques would be adapted to the slower moving deep space satellites.

Other countries responding to the newly created space surveillance mission developed similar wide field of view photographic systems. The Russian AFU-75 camera designed by Lapushka and Abele at the Riga University was a 21 cm f/3.5 system with a 10°×14° field of view. The system was deployed to 15 sites worldwide. Later the same group developed the FAS camera, with a slightly larger 25 cm aperture and f/1.9 optical system with a 7°×10° field of view. The German developed Stellitenbeobachtungsgerät (SBG) significantly increased the aperture of foreign systems with its 42.5 cm f/1.8 system. Perhaps the last of its generation, the Russian VAU finally matched the Baker-Nunn system's combination of aperture and field of view with its 50 cm f/1.4 system and 5°×30° field of view. The VAU used a curved focal surface and a unique two-shutter system.

With the shift to electro-optical systems, initially with intensified silicon target cameras, and later with CCD imagers, it was no longer practical to cover the very large focal surfaces of the previous generation of satellite tracking cameras. The next generation of systems would have more modest fields of view that were matched to the relatively small imaging detectors of the day. To support these systems, significant development efforts focused on increasing the format size of intensified silicon detectors, ultimately leading to the original GEODSS Ebsicon camera with its 76 mm format. The small format size and high read noise of early CCDs slowed the adoption of CCD technology into SSA systems until the upgrade of the Moron Optical Space Surveillance (MOSS) system and the Deep STARE update for GEODSS in the early 1990s.

More recently, small commercial systems have been demonstrated by many groups, starting with the original Raven telescope system by AFRL. These systems used commercial imagers with relatively small formats, and long focal length Cassegrain telescopes originally developed to serve the high-end amateur astronomer. Consequently, these systems adopted a "task-track" surveillance approach. Nonetheless, these systems were highly affordable and provided impressive sensitivity.

Various small stationary and mobile observatories have been demonstrated that use various types of enclosures with roofs that can be opened and closed. The roof designs of the enclosures generally fall into one of two categories, namely, clamshell roof designs and roll-off roof designs. One of the problems associated with mobile observatories is that the roof may not be totally stable in both the opened and closed positions. If the roof is not totally stable in the closed position, problems with mobility can occur. For example, if there is a mechanical failure while the roof is in the closed position during travel, the roof may not remain closed, which can lead to the equipment inside of the enclosure being damaged.

SUMMARY

The present disclosure is related to mobile observatory enclosures. In one aspect, among others, a trailer-based mobile observatory comprises a trailer that is adapted to be attached to a vehicle, an enclosure mounted on the trailer, and a motor-driven system. The enclosure has side walls and a roof. The roof is adapted to be placed in an open position and in a closed position and to be moved from the open position to the closed position, and vice versa. The roof is stable under gravity in the open position and in the closed position. The motor-driven system is mechanically coupled to the roof and is configured to move the roof from the closed position to the open position and from the open position to the closed position.

In accordance with various aspects, the roof can be a clamshell-style roof having first and second sides that are coupled to the motor-driven system. The motor-driven system can be configured to simultaneously open the first and second sides of the roof and to simultaneously close the first and second sides of the roof.

In accordance with various aspects, the motor-driven system can comprise at least first and second motors and at least four chain drive assemblies. Each motor can be configured to turn first and second shafts in a first direction to open the roof and in a second direction that is opposite the first direction to close the roof. Each chain drive assembly can be coupled to an end of one of the shafts such that turning of the shafts in the first direction causes the chain drive assemblies to pull respective chains in the first direction to pull one of the first and second sides of the roof in an opening direction and such that turning the shafts in the second direction causes the chain drive assemblies to pull the respective chains in the second direction to pull one of the first and second sides of the roof in a closing direction.

In accordance with various aspects, each of the chain drive assemblies can comprise one of the chains, a motor-driven sprocket, one or more idler sprockets, and a spring. Each of the chains can be attached on a first end to the enclosure and on a second end to a first end of the respective spring. A second end of the spring can be mechanically coupled to one of the first and second side of the roof. Each motor-driven sprocket can be mechanically coupled to an end of one of the shafts. Each motor-driven sprocket can be mechanically coupled to the respective chain such that when the motor-drive sprocket turns, the respective chain is moved by the sprocket.

In accordance with various aspects, the trailer-based mobile observatory can further comprise a heating, ventilation and air conditioning (HVAC) unit mechanically, thermally and electrically coupled to a front portion of the enclosure.

In accordance with various aspects, the trailer-based mobile observatory can further comprise one or more power supplies, one or more controllers and/or one or more communications systems disposed in the front portion of the enclosure. The motor-driven system can be electrically coupled to the power supply or supplies, the controller(s) and the communications system(s) to enable the power-driven system to be remotely controlled by a user or robot that is external to and remotely located relative to a location of the observatory.

In accordance with various aspects, the trailer-based mobile observatory can be used for astronomy applications and can further comprise at least one telescope and equipment associated the telescope(s). The telescope(s) and the associated equipment can be electrically coupled to the power supply or supplies, the controller(s) and/or the communications systems to enable the telescope(s) and the associated equipment to be remotely controlled by a user or robot that is external to and remotely located relative to a location of the observatory.

In accordance with various aspects, the observatory can be used for at least one of meteorology, atmospheric research, aircraft or rocket tracking, geodesy and surveying, environmental and spectrometry applications, and can further comprise instruments associated with at least one of meteorology, atmospheric research, aircraft or rocket tracking, geodesy and surveying, environmental and spectrometry applications. The instruments can be electrically coupled to the power supply or supplies, the controller(s) and the communications system(s) to enable the instruments to be remotely controlled by a user or robot that is external to and remotely located relative to a location of the observatory.

In accordance with various aspects, if a mechanical failure of the roof or motor-driven system occurs while the roof is in the closed position, the roof can remain in the closed position to protect any equipment disposed in the enclosure.

In accordance with various aspects, the trailer-based mobile observatory can further comprise a stabilizing system that assists gravity to ensure that the roof remains stable under gravity when it is in the open position and when it is in the closed position.

In accordance with various aspects, the stabilizing system can comprise first and second pairs of rotating arms disposed on an exterior front side and rear side, respectively, of the enclosure. Each rotating arm can be rotationally attached on a first end to the main portion of the enclosure and can be rotationally attached on a second end to one of a first side and a second side of the roof. Each rotating arm can exert a force directed from the roof toward the enclosure in both the open and closed positions.

In accordance with various aspects, the rotating arms can be adjustable in length.

In accordance with various aspects, each rotating arm can comprise a threaded rod with heim joints on the first and second ends of the arm.

In another aspect, a method of deployment of a mobile observatory comprises securing a trailer-based mobile observatory in a stable position; moving, by the motor driven system, the roof from the closed position to the open position where the roof is stable under gravity thereby uncovering observation equipment; obtaining observation information using the observation equipment; and moving, by the motor driven system, the roof from the open position to the closed position where the roof is stable under gravity thereby covering the observation equipment. The trailer-based mobile observatory can comprise an enclosure housing observation equipment, the enclosure having side walls and a roof, the roof being adapted to be moved between a closed position where the observation equipment is covered and an open position where the observation equipment is uncovered, the roof being stable under gravity in the open position and in the closed position; and a motor-driven system mechanically coupled to the roof, the motor-driven system being configured to move the roof between the closed and open positions.

In accordance with various aspects, the roof can be a clamshell-style roof having first and second sides coupled to the motor-driven system, wherein the motor-driven system simultaneously moves the first and second sides of the roof between the closed and open positions. The motor-driven system can comprise chain drive assemblies coupled to the first and second sides of the roof, the chain drive assemblies comprising a motor driven sprocket that moves the first and second sides of the roof to the open position when rotated in a first direction and to the closed position when rotated in a second direction.

In accordance with various aspects, the observation equipment can comprise a telescope and equipment associated with the telescope. The observation equipment can be remotely controlled by a user or robot remotely located relative to a location of the trailer-based mobile observatory via a communications system of the trailer-based mobile observatory.

In accordance with various aspects, the method can comprise communicating the observation information to a remotely located command observatory via a communications system of the trailer-based mobile observatory.

In accordance with various aspects, securing trailer-based mobile observatory in a stable position can comprise lowering the enclosure to rest on a ground surface beneath the enclosure.

These and other features and advantages will become apparent from the following description, drawings and claims.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
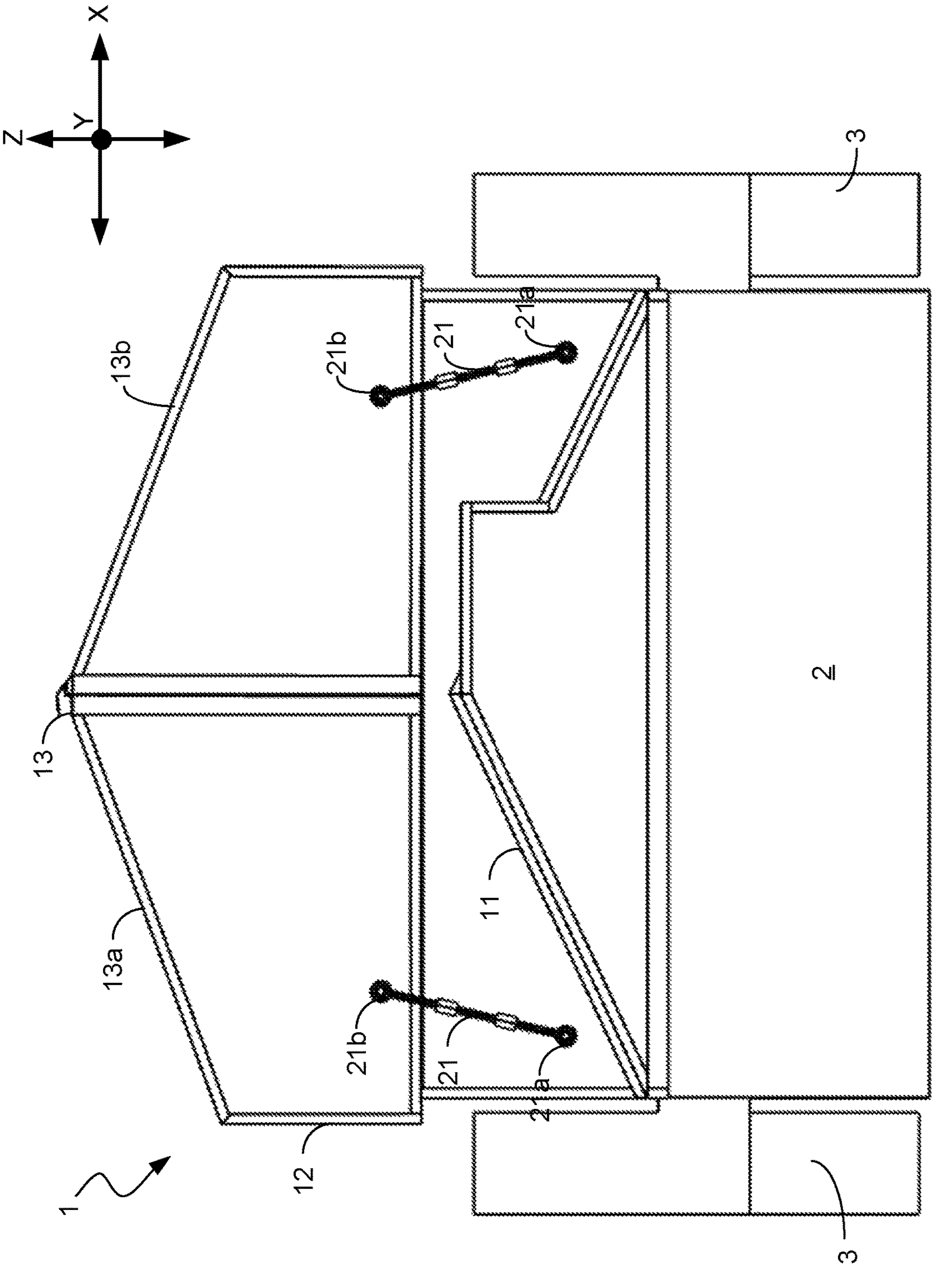
FIG. 1 is a front elevation view of the enclosure, in accordance with various embodiments of the present disclosure.

The present disclosure discloses a trailer-based mobile observatory having a roof that is stable under gravity in the both the open and closed positions to ensure better mobility and robustness for travel while eliminating the risk of the roof opening during travel. This ensures that if there is any mechanical failure while the roof is in the closed position, the roof will remain closed. The trailer-based mobile observatory enclosure can be designed to house one or more telescopes and to enable remote and robotic operation. The enclosure is designed for easy deployment and reliable operation with much thought put into possible failures and ensuring that any failure that occurs does not put the telescope(s) and instruments at risk.

In accordance with a representative embodiment, the enclosure is built on top of an Air-tow™ drop-deck trailer. This heavy-duty utility trailer features a unique hydraulic lifting mechanism which raises or lowers the trailer separate from the wheels and suspension. By lowering the trailer all the way to the ground, weight is removed from the trailer wheels and the trailer floor makes broad contact with the ground resulting in a very stable platform without the need for outrigger jacks or other supports. The seamless lifting mechanism also makes deployment easy and quick. It should be noted, however, that the inventive principles and concepts are not limited in regard to the trailer that is with the mobile observatory.

In accordance with a representative embodiment, the enclosure roof is a clamshell-type design that opens with a compound motion that combines a lateral slide with a rotating pivot. The geometry of the roof is different from known clamshell-type designs in one aspect in that it is designed to clear the trailer wheels outside of the enclosure while still maximizing the available sky and minimizing the outboard displacement when the roof opens. Additionally, the roof is designed to be stable under gravity in both the open and closed positions; i.e., when closed, the roof naturally wants to remain closed and when open the roof naturally wants to remain open. Having the roof stable in the closed position is better for mobility as it makes the system more robust for travel without risk of the enclosure opening while driving down the highway. If there is any mechanical failure while the roof is closed it will remain closed.

The changes to the roof geometry over known roof designs required a rethink of the motor-driven system used to open and close the roof. One known roof design utilizes a simple chain-drive winch that pulls the roof up to close it and releases it under gravity to open it. In accordance with a representative embodiment, the motor-driven system utilizes a winch mechanism that is similar in some regards to this known chain-drive, but unlike the known design, it imparts force to both open and close the roof (due to it being stable under gravity in both positions). In accordance with an embodiment, the winch chain attaches at two points of the roof, namely, the inner edge and the outer edge, in order to both pull the roof open and pull the roof closed. The geometry and movement results in the chain needing to be longer when the roof is open than when it is closed. Thus, the chain is made to be variable length with the addition of an extension spring at the outer attachment. It should be noted, however, that the inventive principles and concepts are not limited to this particular motor-driven system configuration and that other motor-driven system configurations can be used.

The design of the enclosure, roof and motor-driven system provide a number of advantages, including, but not limited to:

- The roof can close with the telescope in any position eliminating the need for safeguards against damaging the telescope when closing the roof;
- The enclosure design is scalable to larger sizes able to accommodate larger or multiple telescopes in the same enclosure;
- The enclosure has proven to be highly reliable with no failures even through inclement weather and cold snowy winters;
- The enclosure and telescope system can be designed to require minimal infrastructure, e.g., using only a single 120V 15 A (typical household) power outlet and ethernet internet connection; alternatively, the enclosure can be fully self-supported with the use of a generator or solar array and wireless internet connection;
- Overall, the enclosure can be low-cost, particularly in comparison to a traditional permanent dome structure.

Use cases include, but are not limited to:

- Satellite Characterization: Typical astronomical targets are so distant that they appear the same to all observers on Earth. However, satellites are much closer and will appear different depending on geographic location. Furthermore, satellites in low-Earth orbit are only visible over a relatively small area on the ground as the satellite flies overhead. A mobile observatory enables more geographic flexibility for observing specific satellites or for multiple-telescope coordinated observations.
- Night Sky Brightness Surveys: With a mobile observatory, we are able to utilize the same telescope and accompanying instruments to measure the night sky at various sites without the ambiguity of correlating measurements from different instruments and setups.
- Atmospheric Seeing Surveys: Similar to the night sky brightness measurements, the observatory can measure the atmospheric seeing at various sites without the ambiguity of correlating measurements from different instruments.
- Observatory Site Characterization: The mobility and minimal infrastructure requirements enable us to move the observatory to remote sites to test their validity for future permanent observatory construction.

Outreach: Conducting astronomy education and outreach with students is difficult as it requires traveling (often far distances) to access a telescope. A mobile observatory can easily move from school to school enabling students to learn astronomy from their own school.

General Mobile Laboratory: The observatory design is not limited to astronomical observatories or telescopes. Many other areas of research could also benefit from a reliable mobile enclosure.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art. Relative terms, such as "over," "above," "below," "top," "bottom," "upper," "lower," "front" and "back" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Relative terms may be used to describe the various elements' relationships to one another, as illustrated in the accompanying drawings. These relative terms are intended to encompass different orientations of the device and/or elements in addition to the orientation depicted in the drawings.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or memory devices. The memory may, for example, be multiple memories within the same computer system. The memory may also be multiple memories distributed amongst multiple computer systems or computing devices.

A "controller," as that term is used herein, encompasses an electronic component that is able to execute a computer program or executable computer instructions. The term "computer," as that term is used herein, refers to a subset of a controller. A controller can encompass one or more computers, but can also have less functionality than a typical computer. References herein to a computer comprising "a processor" should be interpreted as one or more processors or processing cores. The processor may for instance be a multi-core processor. A processor may also refer to a collection of processors within a single computer system or distributed amongst multiple computer systems. The term "computer" should also be interpreted as possibly referring to a collection or network of computers or computing devices, each comprising a processor or processors. Instructions of a computer program can be performed by multiple processors that may be within the same computer or that may be distributed across multiple computers.

Figure 2:
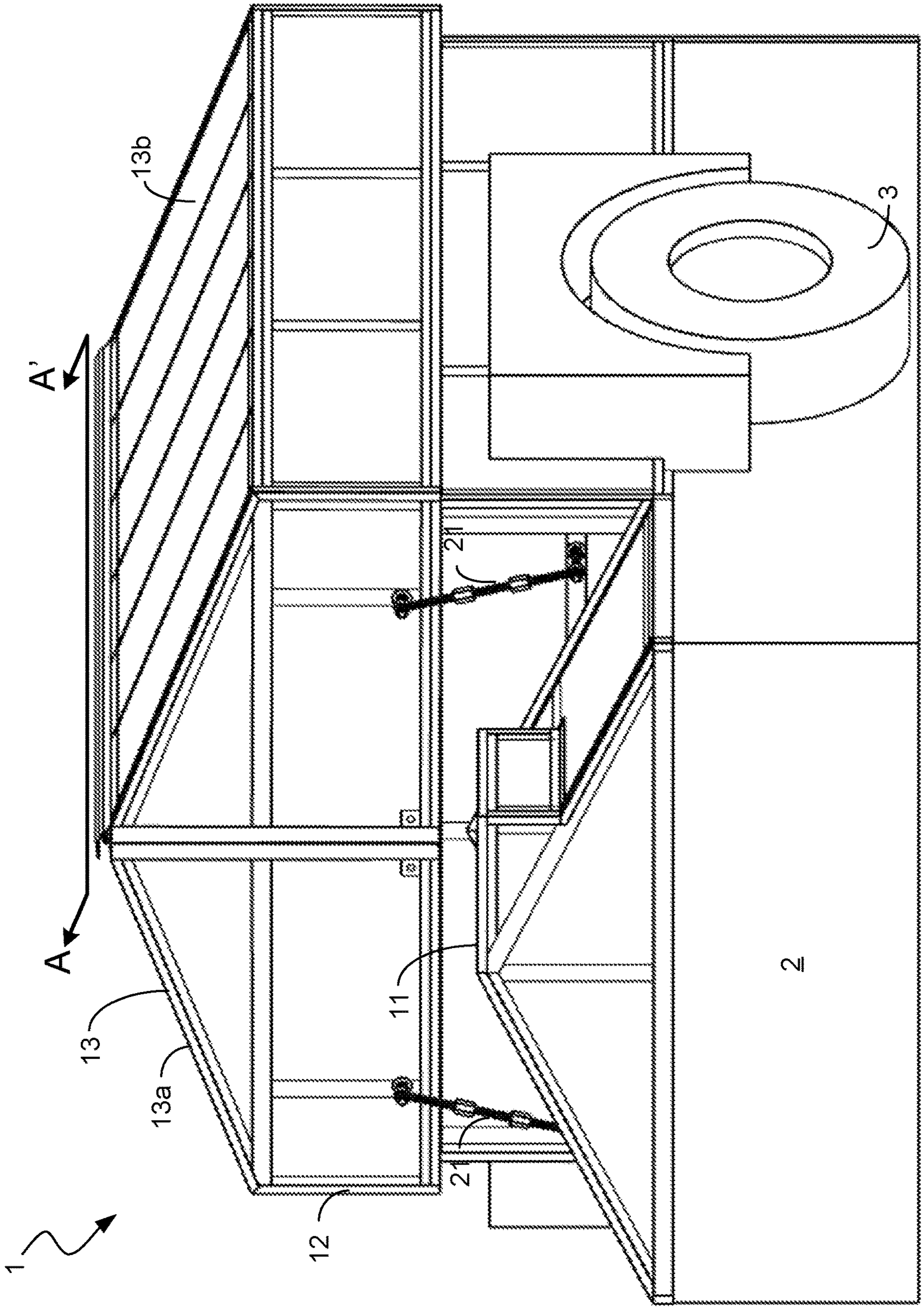
FIG. 2 is a front perspective view of the enclosure shown in FIG. 1, in accordance with various embodiments of the present disclosure.
Figure 3:
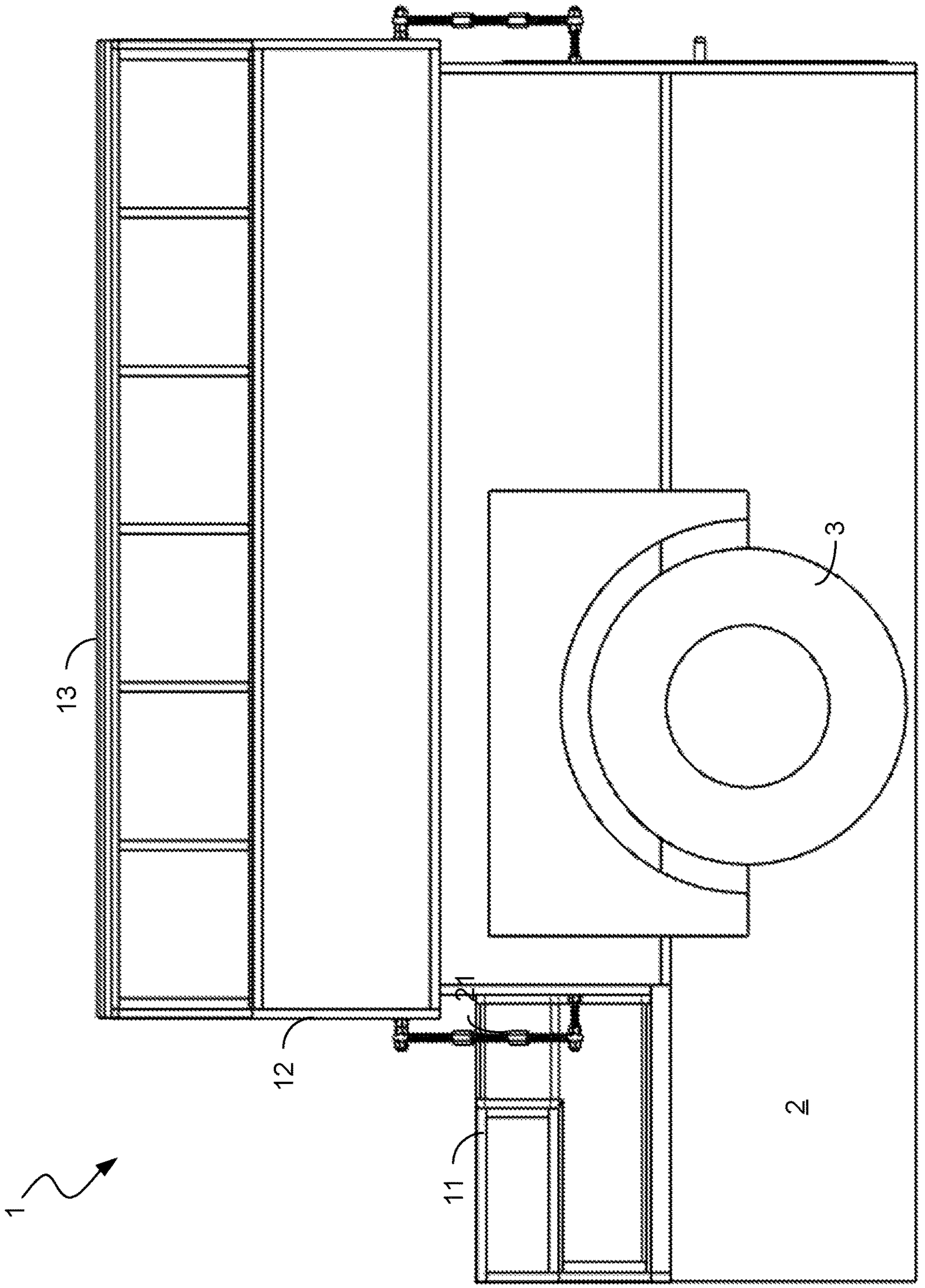
FIG. 3 is a side elevation view of the enclosure shown in FIG. 1, in accordance with various embodiments of the present disclosure.
Figure 4:
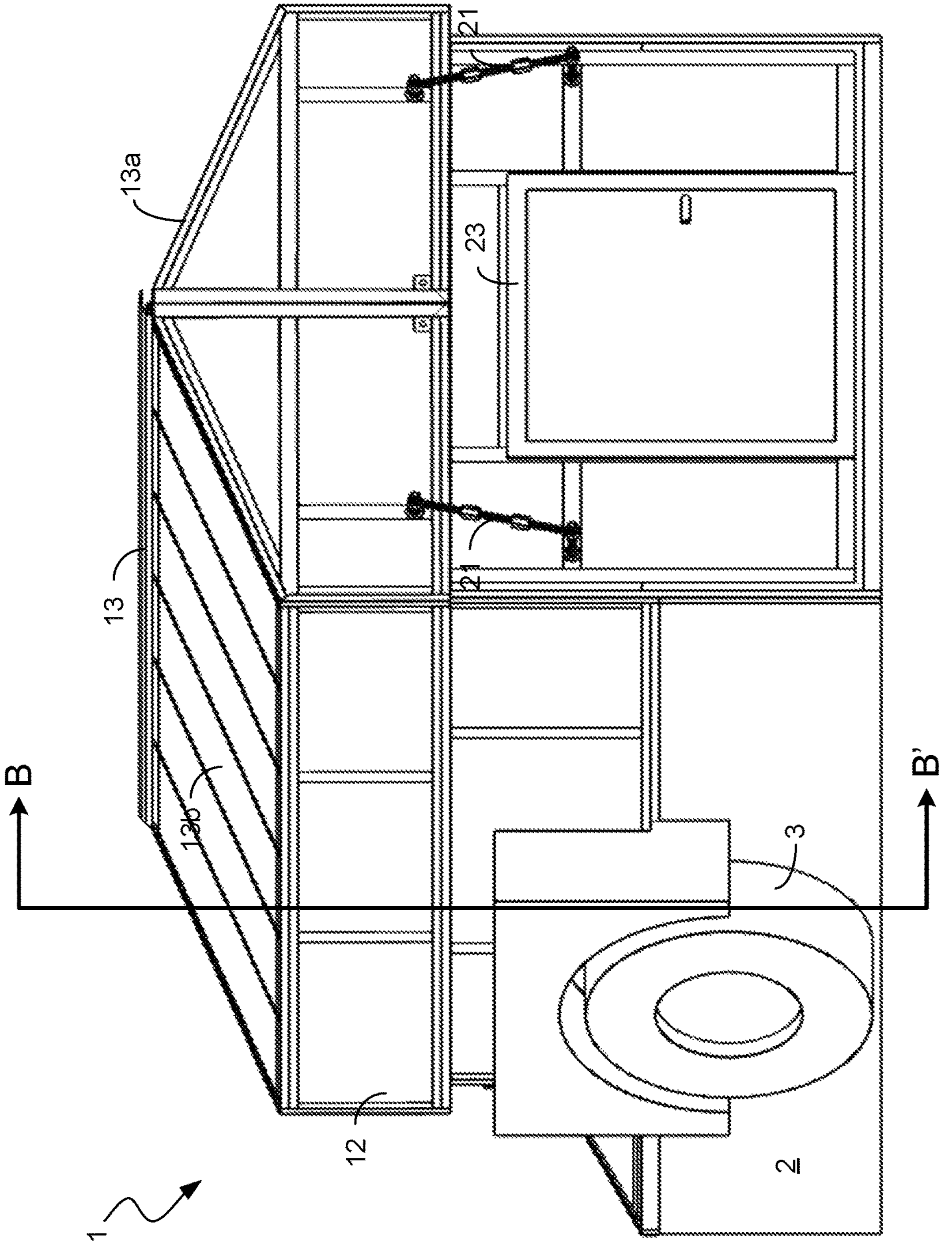
FIG. 4 is a rear perspective view of the enclosure shown in FIG. 1, in accordance with various embodiments of the present disclosure.
Figure 5:
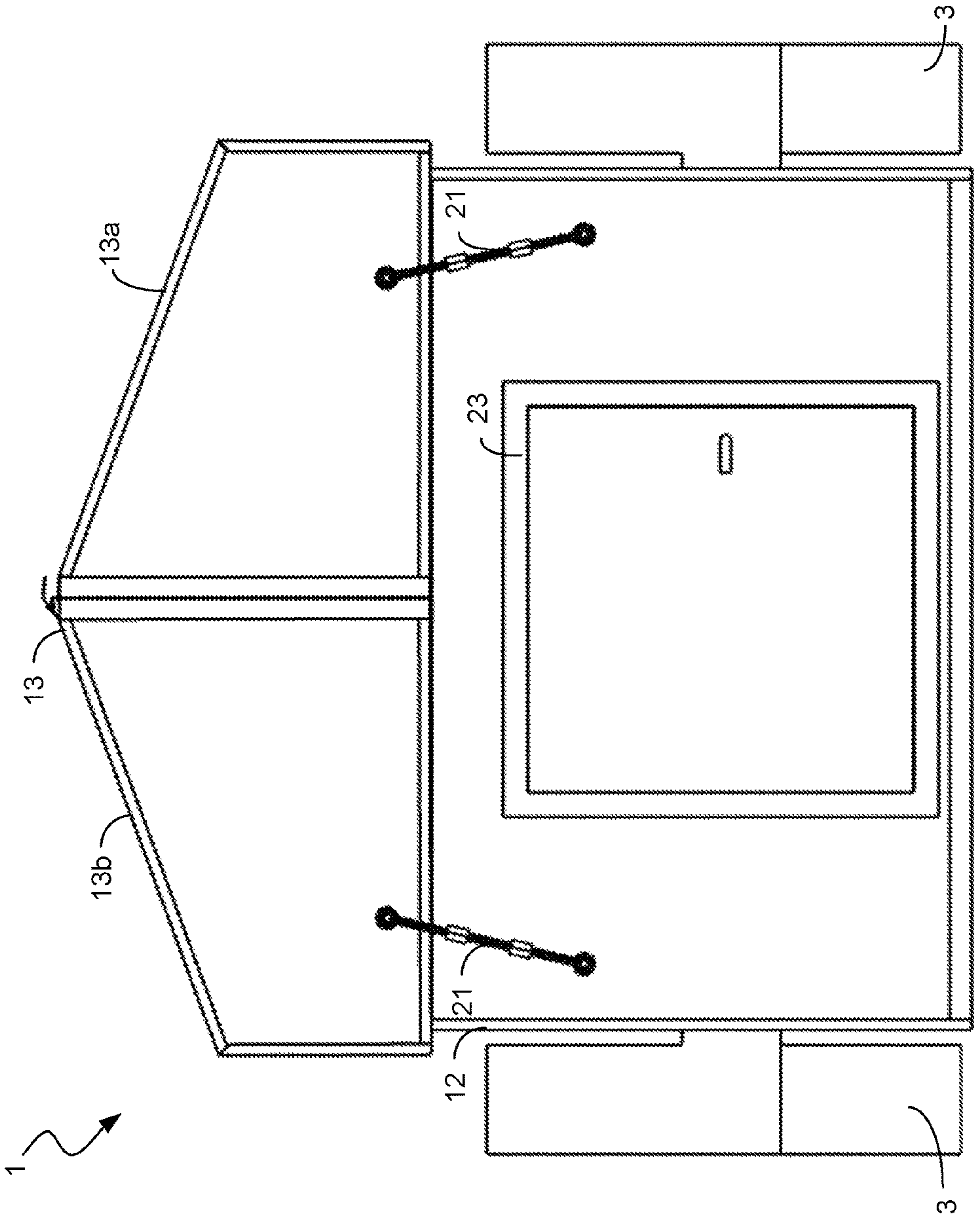
FIG. 5 is a rear elevation view of the enclosure shown in FIG. 1, in accordance with various embodiments of the present disclosure.
Figure 6:
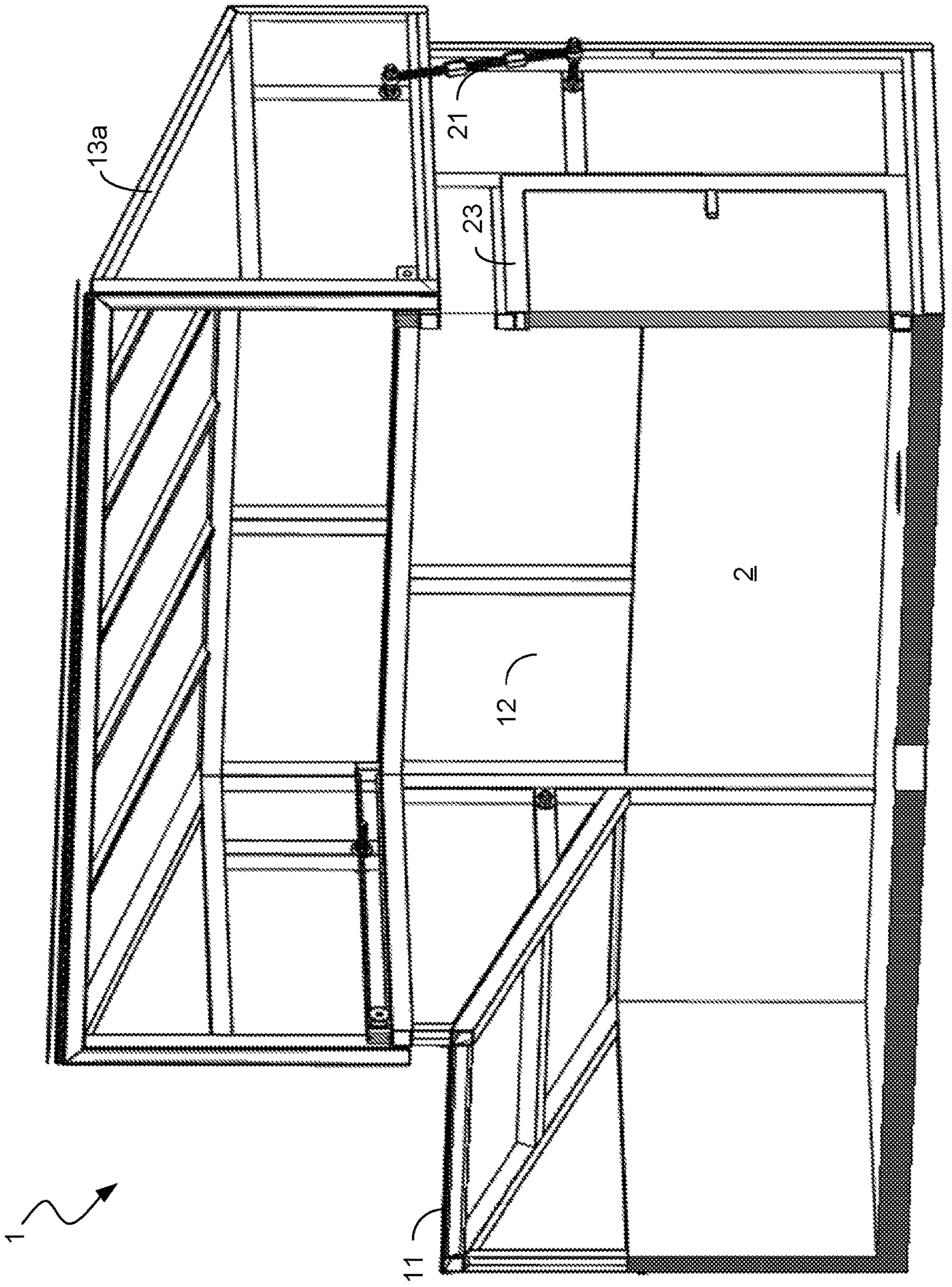
FIG. 6 is a side cross-sectional view of the enclosure shown in FIG. 1 from a rear perspective taken along line A-A' shown in FIG. 2, in accordance with various embodiments of the present disclosure.
Figure 7:
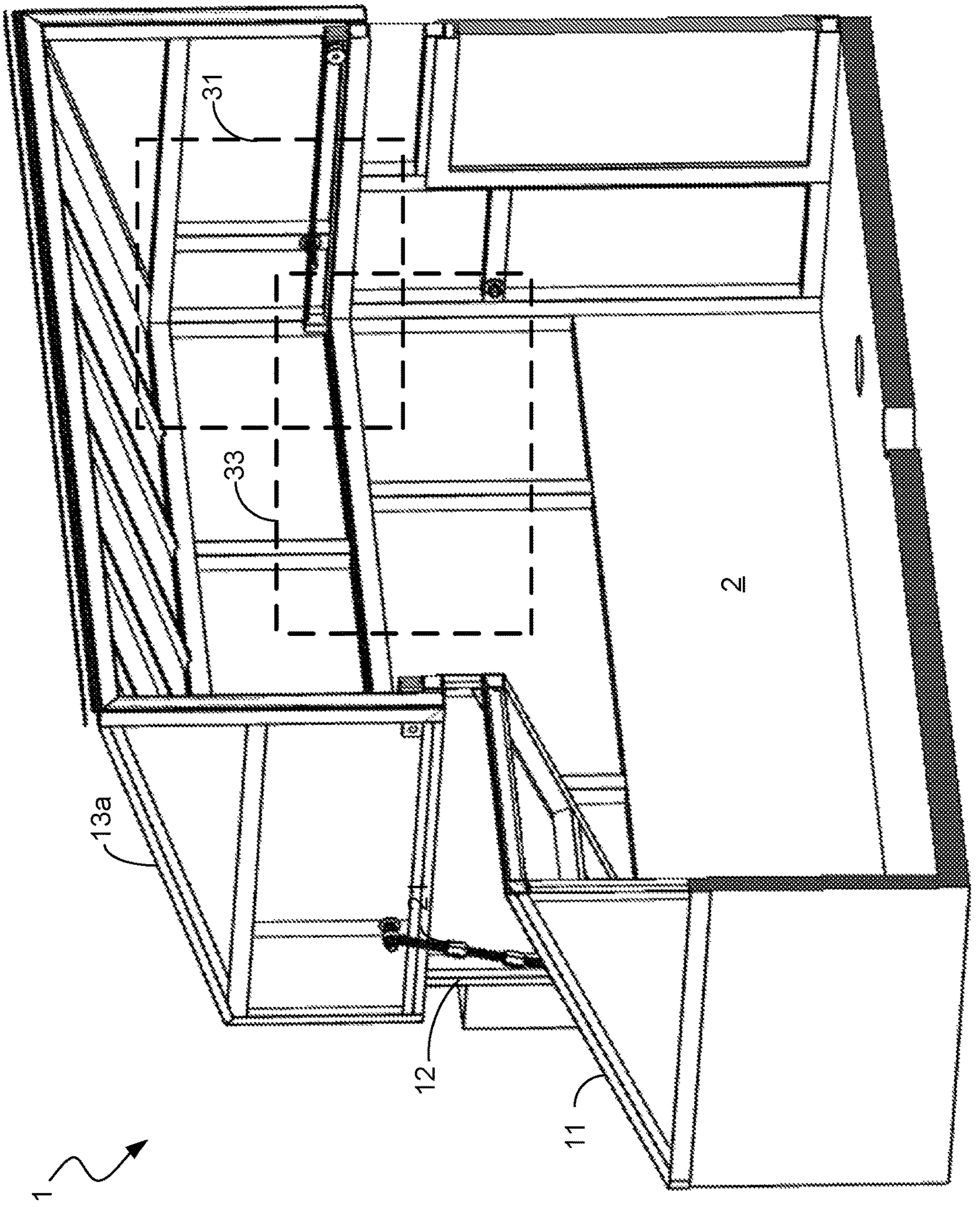
FIG. 7 is a side cross-sectional view of the enclosure shown in FIG. 1 from a front perspective taken along line A-A' shown in FIG. 2, in accordance with various embodiments of the present disclosure.
Figure 8:
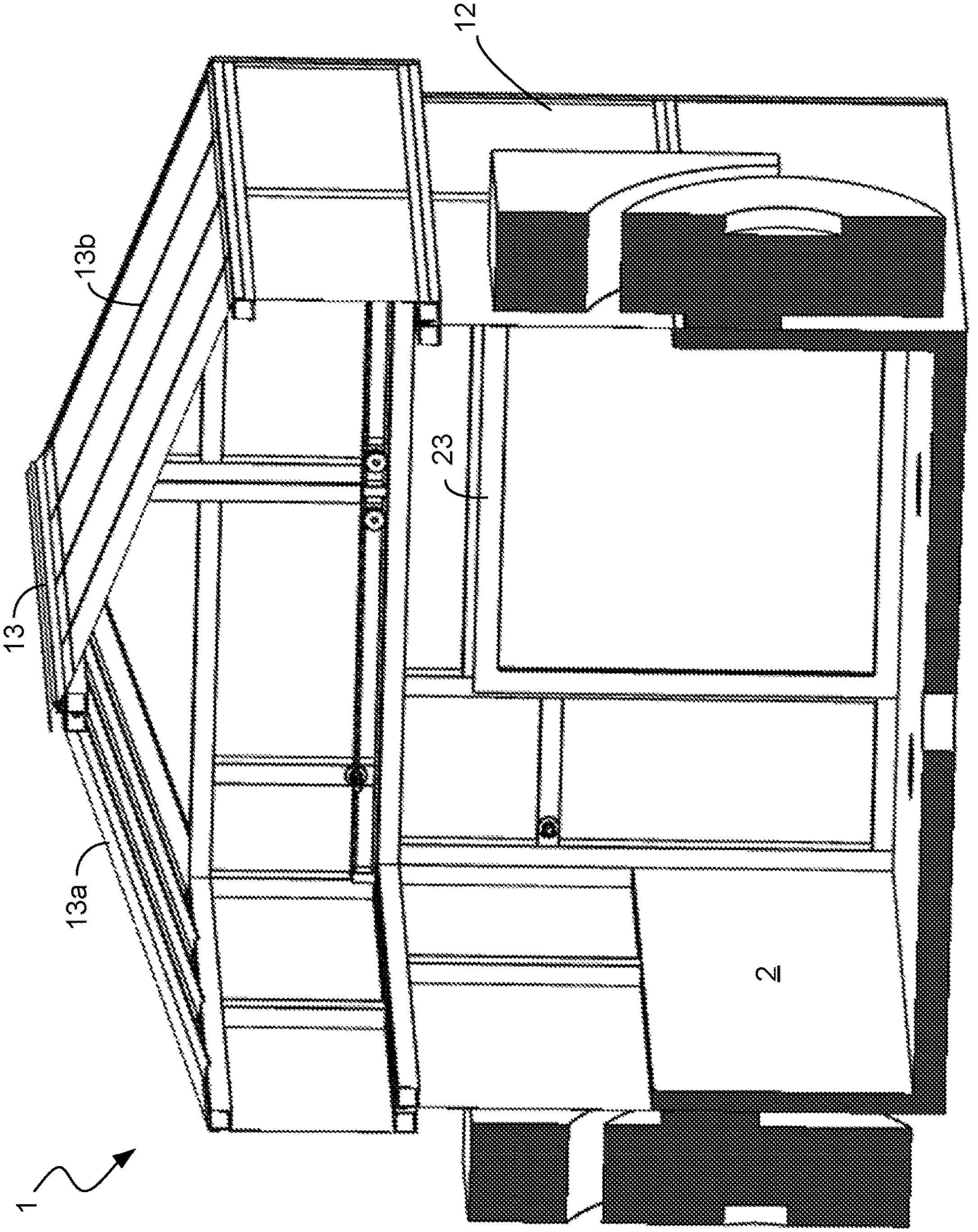
FIG. 8 is a rear cross-sectional view of the enclosure shown in FIG. 1 taken along line B-B' shown in FIG. 4, in accordance with various embodiments of the present disclosure.
Figure 9:
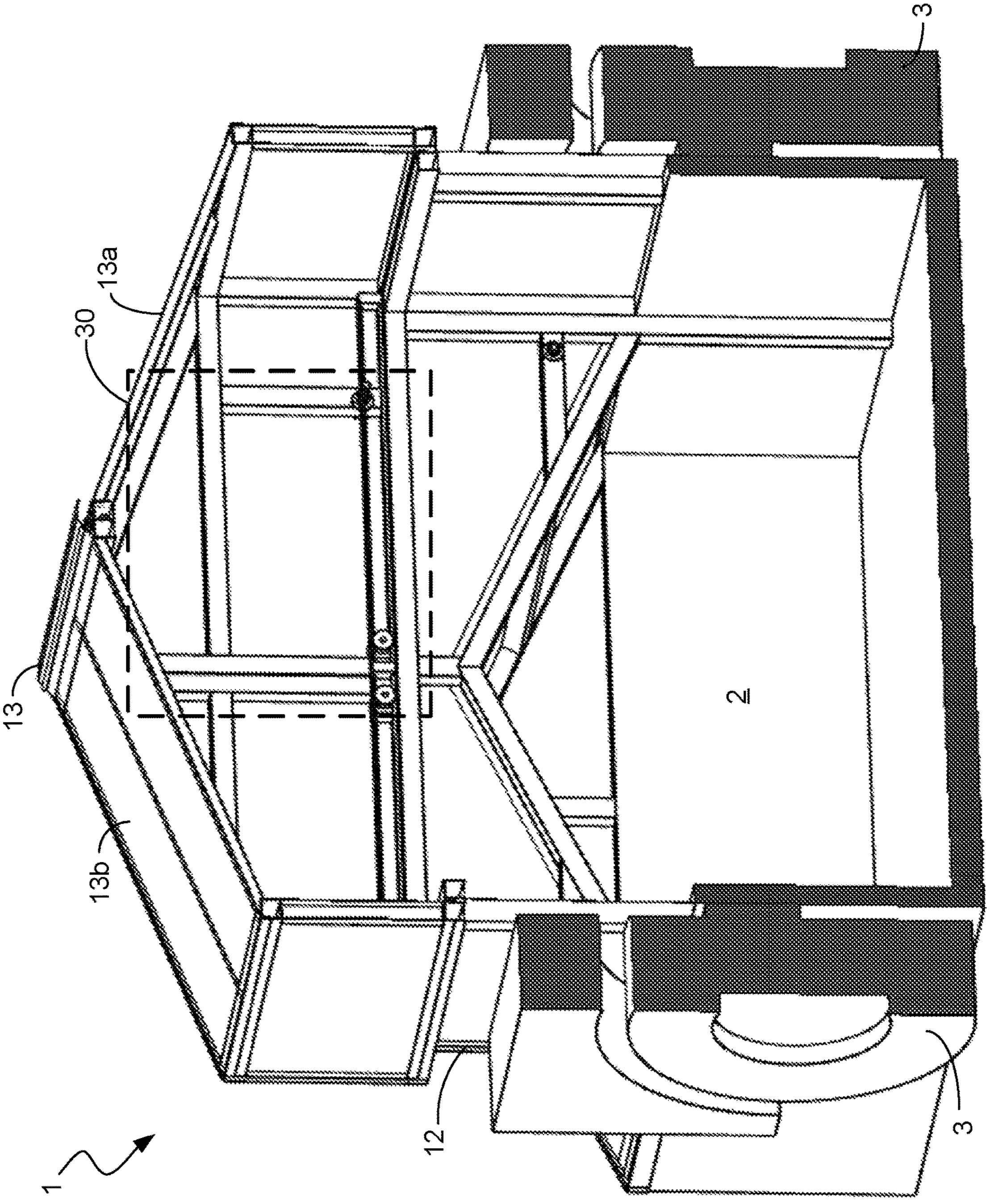
FIG. 9 is a front cross-sectional view of the enclosure shown in FIG. 1 taken along line B-B' shown in FIG. 4, in accordance with various embodiments of the present disclosure.

FIGS. 1-9 show the enclosure 1 in the closed configuration. FIG. 1 is a front elevation view of the enclosure 1 in accordance with a representative embodiment. FIG. 2 is a front perspective view of the enclosure 1 shown in FIG. 1 in accordance with a representative embodiment. FIG. 3 is a side elevation view of the enclosure 1 shown in FIG. 1 in accordance with a representative embodiment. FIG. 4 is a rear perspective view of the enclosure 1 shown in FIG. 1 in accordance with a representative embodiment. FIG. 5 is a rear elevation view of the enclosure 1 shown in FIG. 1 in accordance with a representative embodiment. FIG. 6 is a side cross-sectional view of the enclosure 1 shown in FIG. 1 from a rear perspective taken along line A-A' shown in FIG. 2. FIG. 7 is a side cross-sectional view of the enclosure 1 shown in FIG. 1 from a front perspective taken along line A-A' shown in FIG. 2. FIG. 8 is a rear cross-sectional view of the enclosure 1 shown in FIG. 1 taken along line B-B' shown in FIG. 4. FIG. 9 is a front cross-sectional view of the enclosure 1 shown in FIG. 1 taken along line B-B' shown in FIG. 4.

Figure 10:
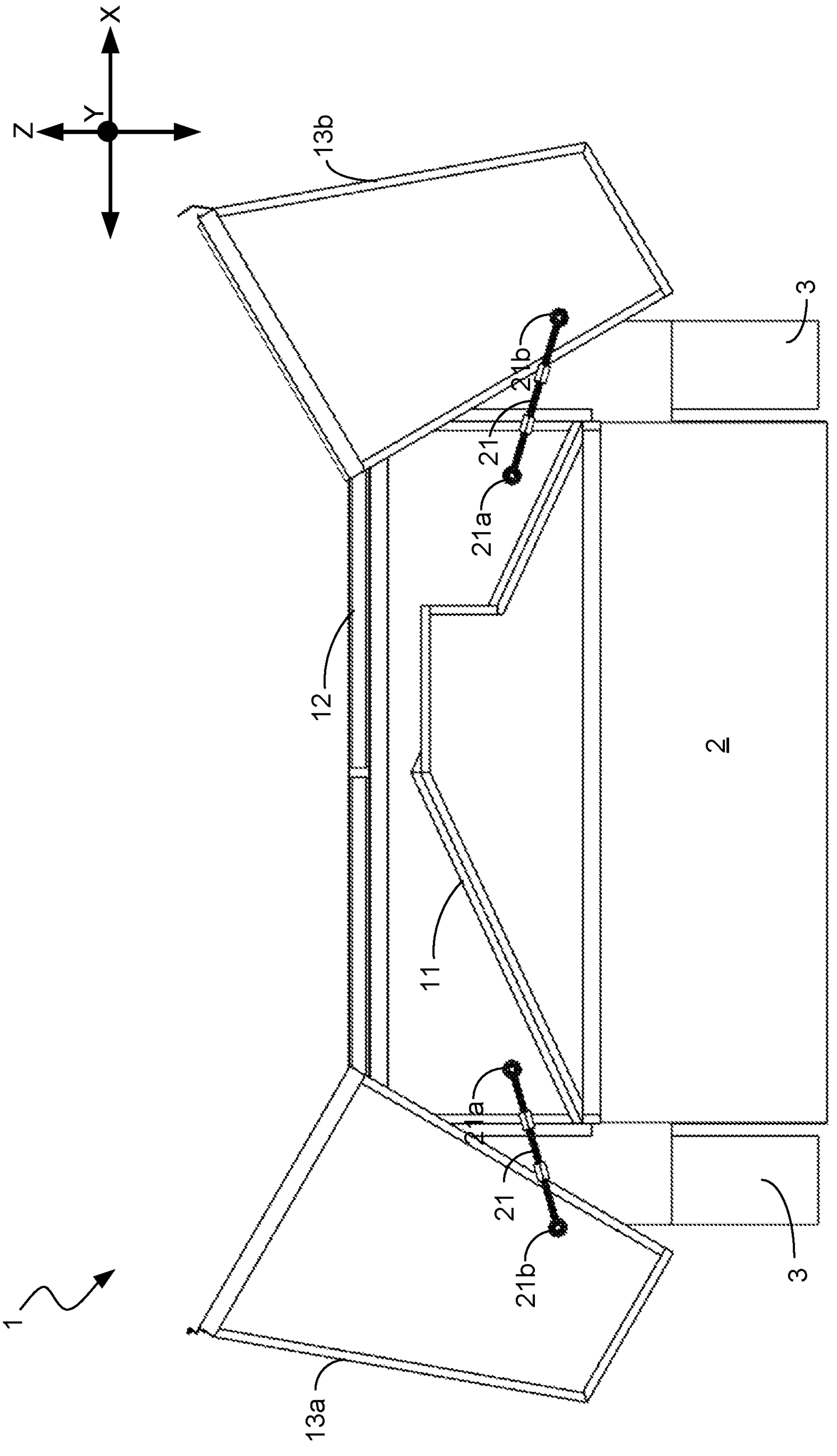
FIG. 10 is a front elevation view of the enclosure in the open configuration and FIG. 11 is a top perspective view of the enclosure in the open configuration, in accordance with various embodiments of the present disclosure.
Figure 11:
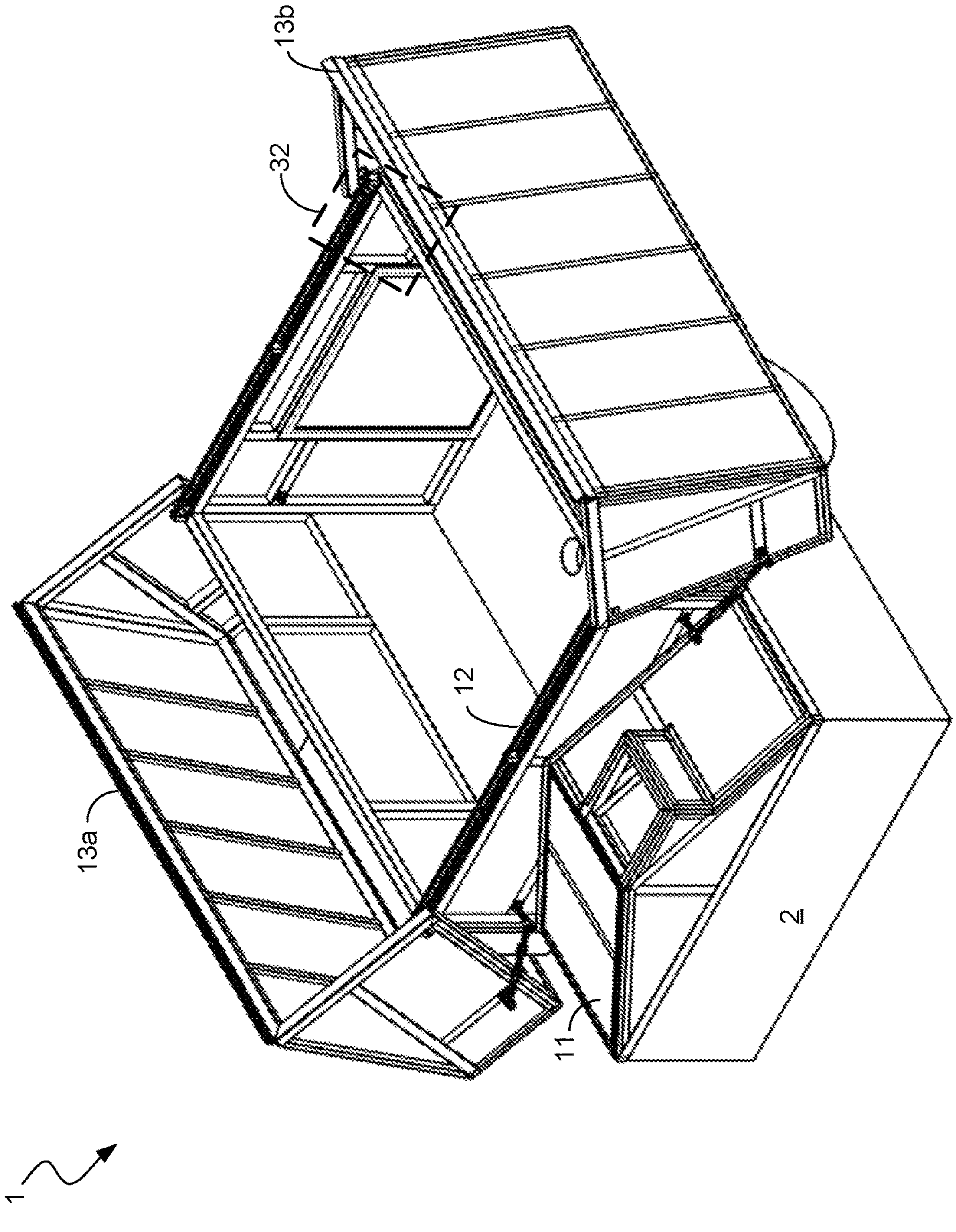

FIGS. 10 and 11 show the enclosure 1 shown in FIGS. 1-9 in the open configuration. FIG. 10 is a front elevation view of the enclosure 1 in the open configuration and FIG. 11 is a top perspective view of the enclosure 1 in the open configuration.

FIGS. 12-15 are photographs of various aspects of the aforementioned motor-driven system in accordance with a representative embodiment for opening and closing the roof of the enclosure 1 shown in FIGS. 1-11.

With reference now to FIGS. 1-9, the enclosure 1 is shown mounted on the aforementioned trailer 2 with the trailer 2 in the lowered position such that the trailer 2 is in contact with the ground or whatever structure the trailer is on such that the combined weight of the trailer frame and the enclosure 1 is removed from the trailer wheels 3. This results in a very stable platform that obviates the need for outrigger jacks or other supports. In the figures, only the wheels 3 and the portion of the trailer 2 upon which the enclosure 1 is mounted are shown for ease of illustration. The portion of the trailer 2 that attaches to a vehicle is not shown.

A front portion 11 of the enclosure 1 is adapted for attachment to an HVAC system (not shown) to provide the interior of the enclosure 1 with a temperature-controlled environment for protecting the equipment stored within the interior of the enclosure 1. The front portion 11 can also be used to house power management equipment, electrical components, communication components and computing components (e.g., computer racks). A main portion 12 of the enclosure 1 that includes the clamshell-style roof 13 is configured to house one or more telescopes, one or more telescope mounts and associated equipment (e.g., a flat field panel and mount, one or more sensors, etc.). It should be noted that although the components that are housed in the enclosure 1 are typically those associated with astronomy, the enclosure 1 can be used for any mobile application for which it is deemed suitable, including, but not limited to, meteorology, atmospheric research, aircraft or rocket tracking, geodesy and surveying, environmental studies, spectrometry for environmental, atmospheric, weather and/or climate measurements, etc. A door 23 preferably is disposed in the rear side of the main portion 12.

A wall can be used to partition off the main portion 12 from the clamshell roof 13. In that case, the wall can have one or more openings in it for ventilation. The clamshell-style roof 13 has first and second sides 13*a* and 13*b*, respectively, that can be opened and closed by the aforementioned motor-driven system, as will be described below in more detail with reference to FIGS. 12-15.

As indicated above, the clamshell-style roof 13 is stable under gravity in both the open and closed positions. To achieve this, a stabilizing system is employed to ensure that the roof 13 remains stable under gravity when it is in the open position and when it is in the closed position. The front and rear sides of the enclosure 1 each include a pair of rotating arms 21 that operate to stabilize the roof 13 in both the closed position, as shown in FIG. 1, and in the open position, as shown in FIG. 10. In accordance with a representative embodiment, each rotating arm 21 is implemented as a one-inch threaded rod with heim joints on both ends. In accordance with a representative embodiment, the rotating arms are adjustable in length in order to allow the geometry to be fine-tuned to optimize the motion of the roof 13 during opening/closing. It should be noted that the rotating arms 21 can be implemented using a variety of configurations. Also, in some embodiments, the rotating arms 21 are fixed in length.

Each rotating arm 21 is rotationally attached on a first end to the main portion 12 of the enclosure 1 and is rotationally attached on a second end to one of sides 13*a* and 13*b* of the roof 13. As seen with reference to the X, Y, Z Cartesian coordinate system shown in FIG. 1, when the roof 13 is in the closed position, the distance between the first ends 21*a* of the rotating arms 21 is greater in the X-direction than the distance between the second ends 21*b* in the X-direction. This difference in distances between the ends 21*a* and the ends 21*b* ensures that the arms 21 exert generally Z-directed forces on the sides 13*a* and 13*b* of the roof 13 toward the surface on which the trailer 2 is traveling or is mounted to assist the force of gravity in maintaining the roof 13 in the closed position. As seen with reference to the X, Y, Z Cartesian coordinate system shown in FIG. 10, when the roof 13 is in the open position, the distance between the first ends 21*a* of the rotating arms 21 is less than the distance between the second ends 21*b* in the X-direction. This difference in distances between the ends 21*a* and the ends 21*b* ensures that the arms 21 exert generally X-directed forces on the sides 13*a* and 13*b* of the roof 13 toward the center of the enclosure 1 to assist the force of gravity in maintaining the roof 13 in the open position.

Figure 12:
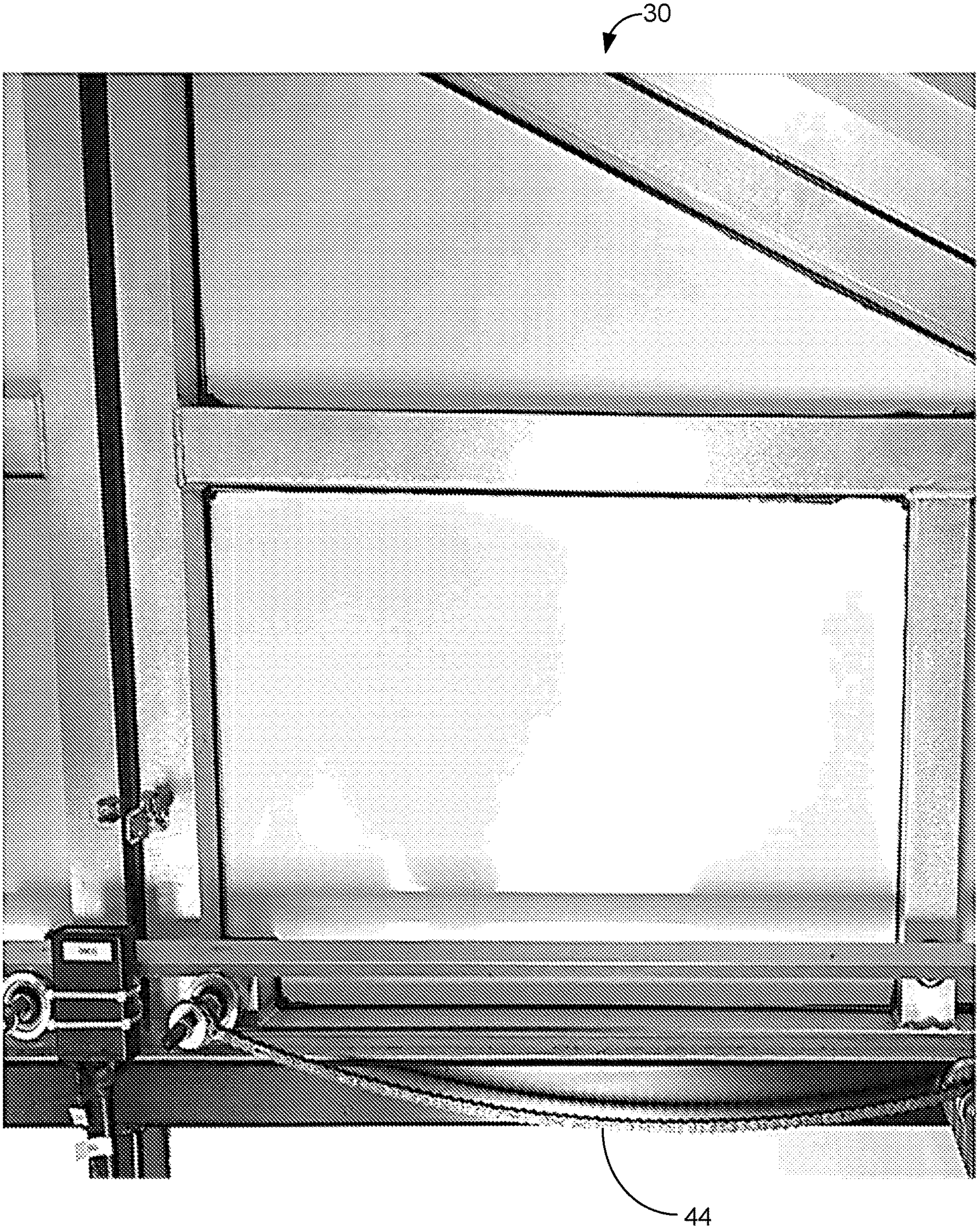
FIGS. 12-15 are photographs of various aspects of the motor-driven system for opening and closing the roof of the enclosure shown in FIGS. 1-11, in accordance with various embodiments of the present disclosure.
Figure 13:
Figure 14:
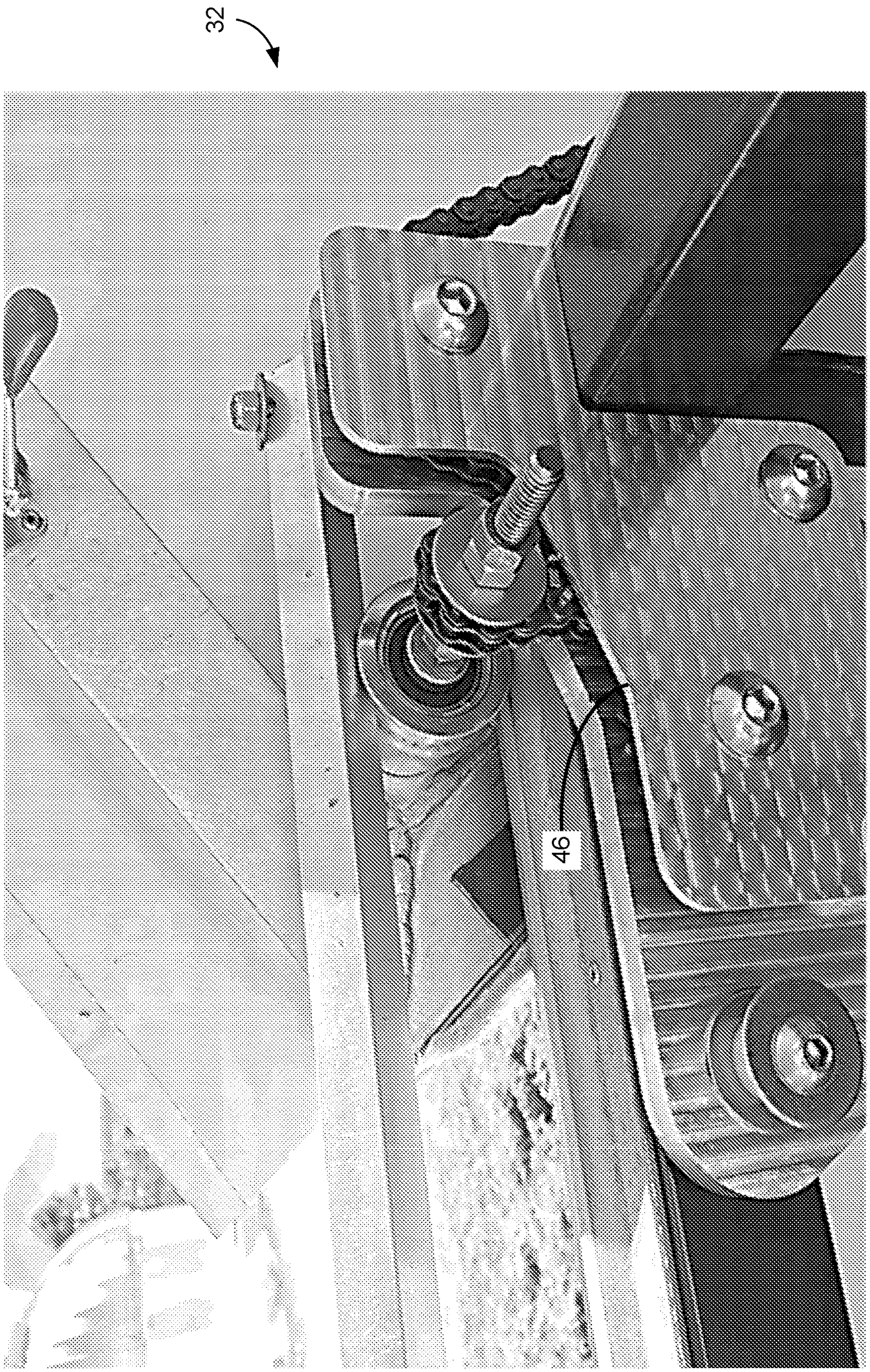
Figure 15:
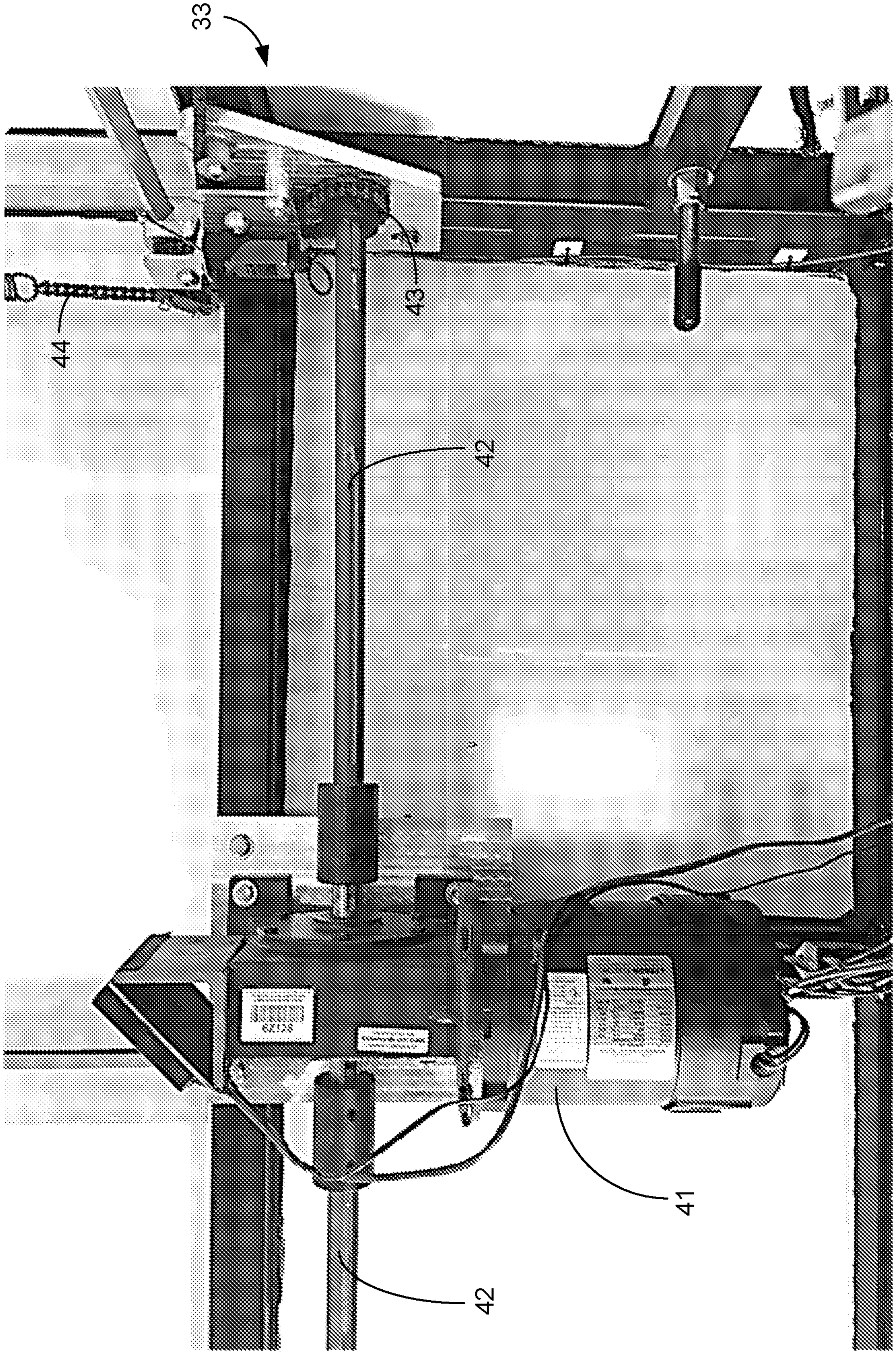

In accordance with a representative embodiment, the motor-driven system comprises two identical drive configurations. For ease of illustration, the motor-driven system is not shown in FIGS. 1-9. FIG. 12 is a photograph of a portion of the motor-driven system at the location indicated by dashed box 30 in FIG. 9. FIG. 13 is a photograph of a portion of the motor-driven system at the location indicated by dashed box 31 in FIG. 7. FIG. 14 is a photograph of a portion of the motor-driven system at the location indicated by dashed box 32 in FIG. 11. FIG. 15 is a photograph of one of the two motors of the motor-driven system at the location indicated by dashed box 33 in FIG. 7.

The motor-driven system depicted in FIGS. 12-15 comprises two of the motors 41 shown in FIG. 15 and four of the chain drive assemblies, one in each corner of the enclosure 1. Portions of the chain drive assemblies are shown in FIGS. 12-14. Each motor 41 turns two shafts 42 that are connected on their ends to respective sprockets 43 of the respective chain drive assembly, as best seen in FIG. 13. In order to ensure stability of the roof under gravity in both the open and closed positions, each of the two motors 41 pulls the chains 41 of the chain drive assemblies coupled to the ends of the two shafts 42 by rotating two of the sprockets 43 in a first direction to move the roof 13 from the closed position to the open position and by rotating the sprockets 43 in the opposite direction to move the roof 13 from the open position to the closed position. For this reason, each of the chains 44 is attached at both ends. Each chain drive assembly typically also includes one or more idler sprockets (not shown), which are located behind an aluminum cover 46 (FIG. 14) in this representative embodiment. Each chain drive assembly includes a large extension spring 45. Due to the geometry of the roof movement, the chain 44 needs to be longer when the roof 13 is open than when it is closed. The springs 45 provide tension, but also enable the chains 44 to vary in length by a few inches. The motors 41 preferably are configured to be connected to a wired and/or wireless network to enable remote operation of the motors 41.

In the representative embodiment described above, the mobile observatory has been described as a stand-alone observatory. It should be noted, however, that multiple instances of the observatory can be operate in conjunction with one another. For example, multiple mobile observatories having the configuration described above can be deployed at multiple locations on the Earth and their observations can be communicated to one another and/or to one of the mobile observatories that is configured to operate as the command observatory. In such cases, the command mobile observatory can have a controller or computer that sends instructions to the controllers of the other mobile observatories to cause them to perform particular functions, such as collecting observation data and communicating it to the controller or computer of the command mobile observatory, for example. In some cases, an array of the observatories can be deployed in an area with sensors (e.g., for geological, seismic and/or environmental data collection), and the instrumentation per observatory can be "stripped down" to only that which is needed to perform particular functions.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. A trailer-based mobile observatory comprising:

a trailer that is adapted to be attached to a vehicle;

an enclosure mounted on the trailer, the enclosure having a front wall, a rear wall, and two side walls extending between the front and rear walls, and a clamshell-style roof having first and second sides coupled between the front and rear walls and configured to open in opposite directions, the clamshell-style roof being adapted to be placed in an open position and in a closed position and to be moved from the open position to the closed position, and vice versa, the clamshell-style roof being stable under gravity in the open position and in the closed position; and a motor-driven system mechanically coupled to the first and second sides of the clamshell-style roof, the motor-driven system comprising chain drive assemblies coupled to ends of first and second shafts and to the first and second sides of the clamshell-style roof, the chain drive assemblies configured to move the first and second sides of the clamshell-style roof from the closed position to the open position and from the open position to the closed position.

2. The trailer-based mobile observatory of claim 1, wherein the motor-driven system is configured to simultaneously open the first and second sides of the clamshell-style roof and to simultaneously close the first and second sides of the clamshell-style roof.

3. The trailer-based mobile observatory of claim 2, wherein the motor-driven system comprises:

at least first and second motors, each motor being configured to turn the first and second shafts in a first direction to open the clamshell-style roof and in a second direction that is opposite the first direction to close the clamshell-style roof; and at least four chain drive assemblies, each chain drive assembly being coupled to an end of one of the shafts, wherein turning of the shafts in the first direction causes the chain drive assemblies to pull respective chains in the first direction to pull one of the first and second sides of the clamshell-style roof in an opening direction and wherein turning of the shafts in the second direction causes the chain drive assemblies to pull the respective chains in the second direction to pull one of the first and second sides of the clamshell-style roof in a closing direction.

4. The trailer-based mobile observatory of claim 3, wherein each of the chain drive assemblies comprises:

one of the respective chains, said one of the respective chains being attached on a first end to the enclosure;

a motor-driven sprocket that is mechanically coupled to an end of one of the shafts, the motor-driven sprocket being mechanically coupled to said one of the respective chains such that when the motor-driven sprocket turns, said one of the respective chains is moved by the motor-driven sprocket;

one or more idler sprockets over which said one of the respective chains travels; and a spring mechanically coupled on a first end to one of the first and second sides of the clamshell-style roof, a second end of the spring being attached to a second end of said one of the respective chains.

5. The trailer-based mobile observatory of claim 3, further comprising:

a heating, ventilation and air conditioning (HVAC) unit mechanically, thermally and electrically coupled to a front portion of the enclosure.

6. The trailer-based mobile observatory of claim 5, further comprising:

one or more power supplies, one or more controllers and one or more communications systems disposed in the front portion of the enclosure, and wherein the motor-driven system is electrically coupled to said one or more power supplies, said one or more controllers and said one or more communications systems to enable the motor-driven system to be remotely controlled by a user or robot that is external to and remotely located relative to a location of the observatory.

7. The trailer-based mobile observatory of claim 6, wherein the observatory is used for astronomy applications and further comprises:

at least one telescope and equipment associated with said at least one telescope, said at least one telescope and the associated equipment being electrically coupled to said one or more power supplies, said one or more controllers and said one or more communications systems to enable the said at least one telescope and the associated equipment to be remotely controlled by a user or robot that is external to and remotely located relative to a location of the observatory.

8. The trailer-based mobile observatory of claim 6, wherein the observatory is used for at least one of meteorology, atmospheric research, aircraft or rocket tracking, geodesy and surveying, environmental and spectrometry applications, and further comprises:

instruments associated with at least one of meteorology, atmospheric research, aircraft or rocket tracking, geodesy and surveying, environmental and spectrometry applications, the instruments being electrically coupled to said one or more power supplies, said one or more controllers and said one or more communications systems to enable the instruments to be remotely controlled by a user or robot that is external to and remotely located relative to a location of the observatory.

9. The trailer-based mobile observatory of claim 1, wherein if a mechanical failure of the clamshell-style roof or motor-driven system occurs while the clamshell-style roof is in the closed position, the clamshell-style roof remains in the closed position to protect any equipment disposed in the enclosure.

10. The trailer-based mobile observatory of claim 1, further comprising:

a stabilizing system that assists gravity to ensure that the clamshell-style roof remains stable under gravity when it is in the open position and when it is in the closed position.

11. The trailer-based mobile observatory of claim 10, wherein the stabilizing system comprises:

first and second pair of rotating arms disposed on an exterior front side and rear side, respectively, of the enclosure, each rotating arm being rotationally attached on a first end to the front wall or rear wall of the enclosure and being rotationally attached on a second end to one of the first side or the second side of the clamshell-style roof, each rotating arm exerting a force directed from the clamshell-style roof toward the enclosure in both the open and closed positions.

12. The trailer-based mobile observatory of claim 11, wherein the rotating arms are adjustable in length.

13. The trailer-based mobile observatory of claim 12, wherein each rotating arm comprises a threaded rod with heim joints on the first and second ends of the arm.

14. A method of deployment of a mobile observatory, comprising:

securing a trailer-based mobile observatory in a stable position, the trailer-based mobile observatory comprising:

an enclosure housing observation equipment, the enclosure having a front wall, a rear wall, and two side walls extending between the front and rear walls, and a clamshell-style roof having first and second sides coupled between the front and rear walls and configured to open in opposite directions, the first and second sides of the clamshell-style roof being adapted to be moved between a closed position where the observation equipment is covered and an open position where the observation equipment is uncovered, the clamshell-style roof being stable under gravity in the open position and in the closed position; and a motor-driven system mechanically coupled to the first and second sides of the clamshell-style roof, the motor-driven system comprising chain drive assemblies coupled to ends of first and second shafts and to the first and second sides of the clamshell-style roof, the chain drive assemblies configured to move the first and second sides of the clamshell-style roof between the closed and open positions;

moving, by the motor driven system, the clamshell-style roof from the closed position to the open position where the clamshell-style roof is stable under gravity thereby uncovering the observation equipment;

obtaining observation information using the observation equipment; and moving, by the motor driven system, the clamshell-style roof from the open position to the closed position where the clamshell-style roof is stable under gravity thereby covering the observation equipment.

15. The method of claim 14, wherein the motor-driven system simultaneously moves the first and second sides of the clamshell-style roof between the closed and open positions.

16. The method of claim 15, wherein the motor-driven system comprises at least four chain drive assemblies coupled to the first and second sides of the roof, the chain drive assemblies comprising a motor driven sprocket that moves the first and second sides of the clamshell-style roof to the open position when rotated in a first direction and to the closed position when rotated in a second direction.

17. The method of claim 14, wherein the observation equipment comprises a telescope and equipment associated with the telescope.

18. The method of claim 14, wherein the observation equipment is remotely controlled by a user or robot remotely located relative to a location of the trailer-based mobile observatory via a communications system of the trailer-based mobile observatory.

19. The method of claim 14, comprising communicating the observation information to a remotely located command observatory via a communications system of the trailer-based mobile observatory.

20. The method of claim 14, wherein securing the trailer-based mobile observatory in a stable position comprises lowering the enclosure to rest on a ground surface beneath the enclosure.

* * * * *